United States Patent Office.

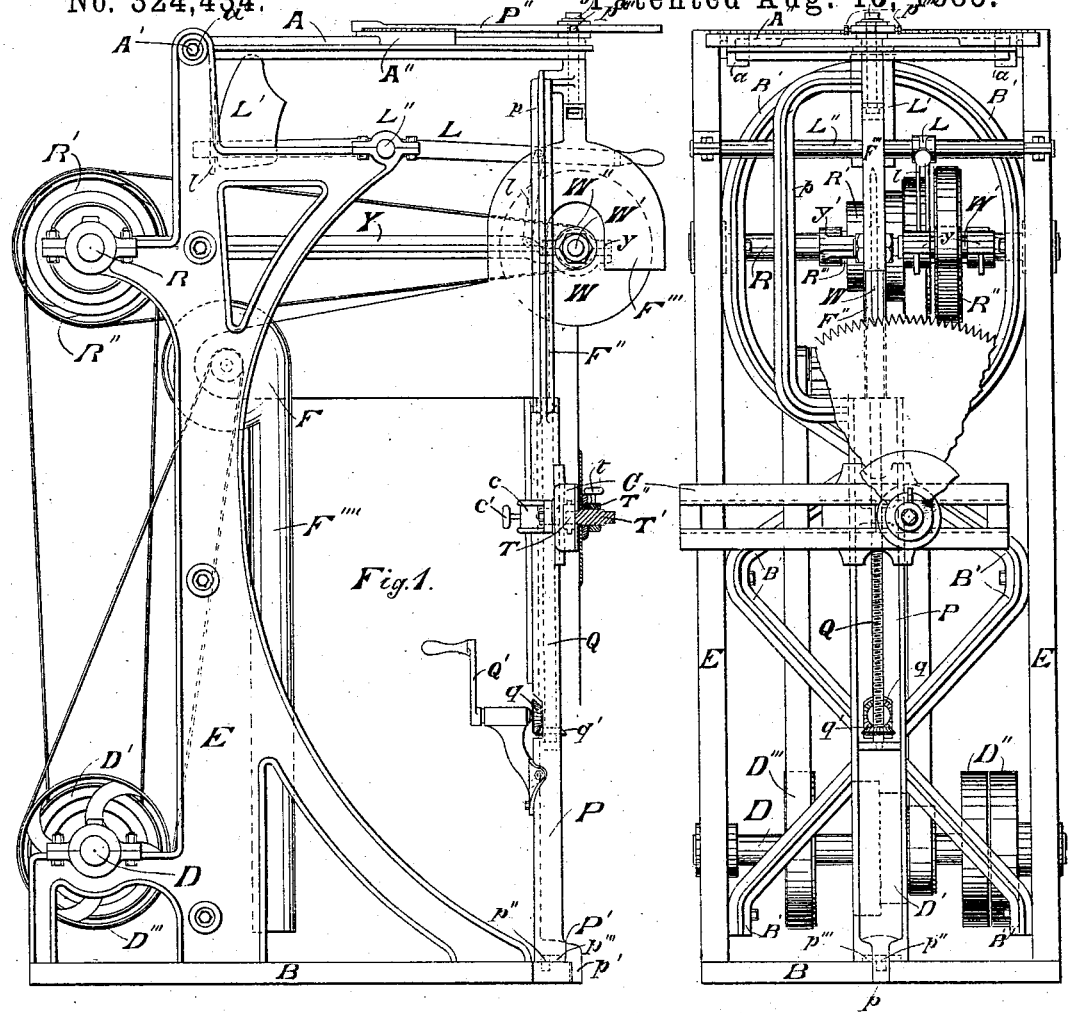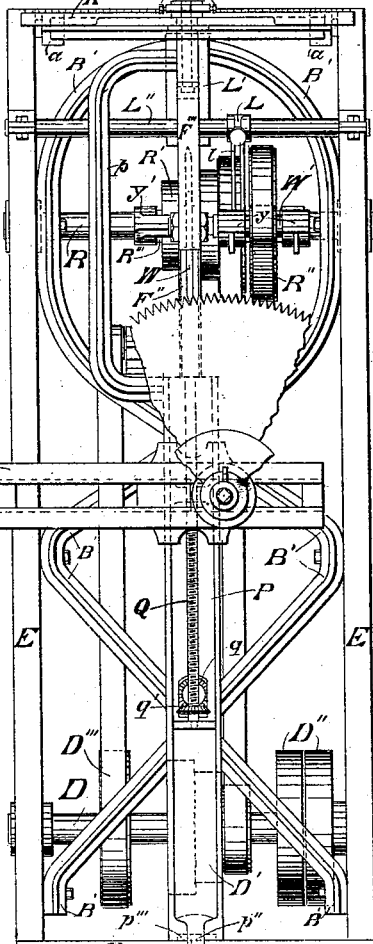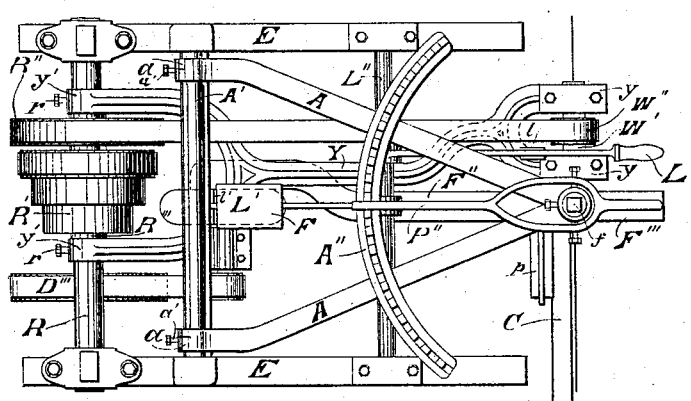

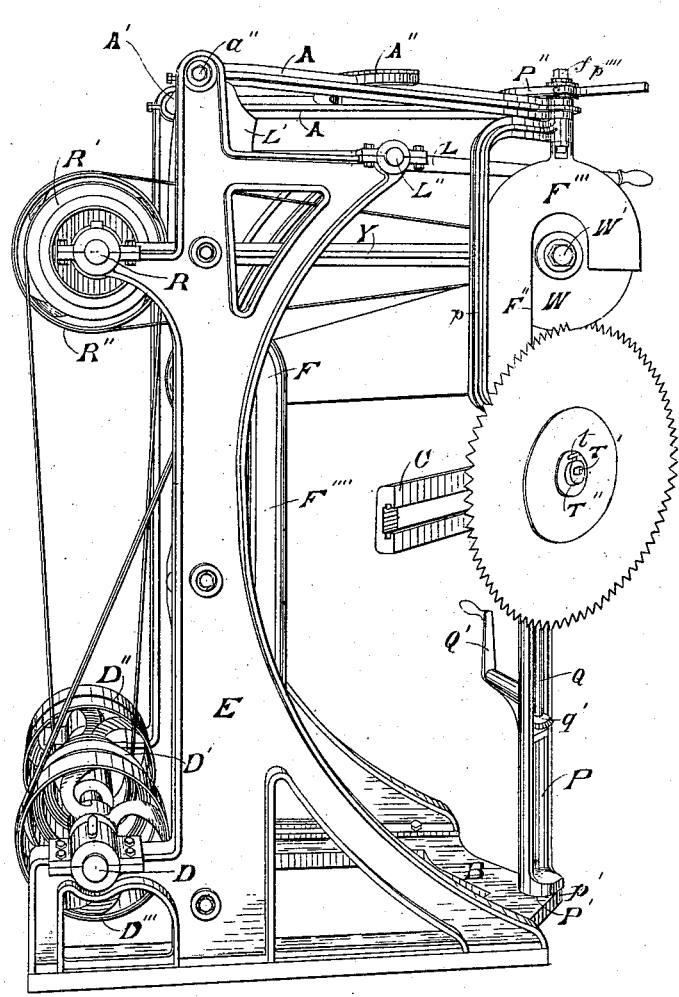

JAMES H. TOTMAN, OF DESERONTO, ONTARIO, CANADA.

MACHINE FOR SHARPENING AND GUMMING SAWS.

SPECIFICATION forming part of Letters Patent No. 324,434, dated August 18, 1885.

Application filed November 24, 1884. (No model.) Patented in Canada December 19, 1884, No. 20,754.

*To all whom it may concern:*

Be it known that I, JAMES H. TOTMAN, of Deseronto, in the Province of Ontario, in the Dominion of Canada, have invented new and useful Improvements in Machines for Gumming and Sharpening Circular Saws, (for which I have obtained a patent in Canada, No. 20,574, bearing date December 19, 1884,) of which the following is a specification.

My invention relates to apparatus for gumming and sharpening circular saws by means of emery-wheels.

The object of my invention is the construction of a machine for gumming, sharpening, and jointing in a finished manner and without injury to health circular saws uniformly and expeditiously, giving any desired pitch, angle, or hook to the teeth, and also any desired bevel.

Figure 1 is a side elevation of my improved machine. Fig. 2 is a front elevation of the same. Fig. 3 is a rear elevation. Fig. 4 is a top view. Fig. 5 is a detail of pivot of the post. Fig. 6 is a perspective view of the machine.

E E are the two frame ends, connected below by a base-plate, B, at the rear by the cross-braces B′, and at the top by the rod A′, said frame-work carrying the entire mechanism of the machine.

P is a post pivoted in a peculiar manner in the front of the base-plate B, and journaled above in the apex of a triangular frame, A, the arms of which terminate in hubs $a$, fixed by set-screw $a'$ upon a tie-rod, A′, the ends of which pass through the frame ends and are secured by nuts $a''$. The post P is cranked sidewise near the top at $p$, to clear the emery-wheel W, and is furnished with a cross-bar, C, which is slotted longitudinally and adapted to receive a slide-block, T, carrying the saw-arbor T′, upon which the circular saw is secured by a collar, T″, and set-screw $t$, so as to be easily turned by hand. The cross-bar is held upon the post by a collar, $c$, provided with a set-screw, $c'$, and may be raised or lowered to any desired position to suit the different diameters of saws by a screw, Q, passing through a lug in the cross-bar C, and journaled within the post P, said screw being capable of being actuated by means of a handle, Q′, journaled to the post and carrying a miter-wheel, $q$, gearing in a miter wheel, $q'$, fast upon the screw Q. For greater convenience, two cross-bars, similar to C, may be provided to avoid traversing the same great distances when changing from large saws to small, or vice versa. The post is semicircular in cross-section, and has a flat foot, P′, with a semicircular pivot, $p'$, turning in a step in the base-plate, the front half or three-quarters of said step being cut away and the pivot held therein by a pin, $p''$, engaging a semicircular groove, $p'''$, in the face of the foot concentric with the pivot $p'$. The center of the pivot $p'$ is lineable with the center of the journal at the top, the center line passing through the diameter of the emery-wheel and through the plane of the saw, the front portion of the pivot and bearing being cut away to allow large saws to project past the same. The angle of the post P, to obtain the desired bevel of the cutting-faces of the saw-teeth, is controlled by means of the lever P″, secured to the upper end of the journal by two screws or pins, $p''''$, in such manner that the lever will turn the post, but have a slight vertical swivel motion to allow the tail end of the lever to engage or disengage notches in a segment, A″, secured upon the frame A, and thus fix the position of the post, which may be turned through an angle of ninety degrees.

W is the emery-wheel secured upon a shaft, W′, having a pulley, W″, and being journaled in a swing-frame, Y, which is forked in front and rear, the front ends formed into bearings $y$ for the shaft W′, and the rear ends into hubs $y'$, secured by set-screws $r$ upon the rocking shaft R. The latter is journaled at the rear of the frame, and carries between the hubs $y'$ the stepped cone-pulley R′, with the pulley R″, driving the pulley W″ upon the emery-wheel shaft, the hubs of said pulleys forming a sleeve, R‴, rotating upon the said rocking shaft. The vertical motion of the swing-frame Y, and with it the height of the emery-wheel W, is controlled by a counterbalanced lever, L, with a balance-weight, L′, secured upon a rocking shaft, L″, and connected to the swing-frame Y by a link, $l$. The rear end of the lever L moves loosely in a guide, $l'$, limiting its vertical movement.

F is a fan placed in the upper portion of the frame, and having its suction-mouth F″ extended forward to partly incase the emery-wheel, and forming a casing, F‴, for the same, the latter being secured to the post P by means of a bolt, ƒ, passing through the upper journal of the same. The fan F exhausts the casing F‴, thereby drawing away all particles of steel and emery which are being liberated when the emery-wheel is operating upon a saw and discharges the same through a pipe F″″.

D is the driving-shaft journaled below at the rear of the frame. It is provided with fast and loose driving-pulleys D″, a cone-pulley, D′, driving the upper cone-pulley, R′, and with a pulley, D‴, to drive the fan.

It will be noticed that my improved construction provides for the emery-wheel always rotating in the same vertical plane, the desired angle and bevel of the teeth being obtained by the angular adjustment of the post P by the lever P″ and the lateral adjustment of the slide T on the cross-bar C; that the plane of the center line of the emery-wheel shaft W always passes through a vertical line drawn through the saw at the operating-point; that saws so large as to project below the base-plate may be operated upon, and that the operation is free from danger of inhaling particles of steel and emery—all points of importance in this class of machinery.

I claim as my invention—

1. A machine for gumming and sharpening saws, consisting of the combination of the frame-work A A′ B B′ E, driving-shaft D, fast and loose pulleys D″, fan-pulley D‴, cone-pulleys D′ and R′, sleeved loose pulley R″, rocking shaft R, swing-frame Y, having fork-arms y′, secured by set-screws, emery-wheel shaft W′, with pulley W″, and emery-wheel W, counterbalanced lever L, shaft L″, and link l, the post P, screw Q, handle Q′, and connecting miter-gear, cross-bar C, with cross-slide, saw-arbor T′, lever P′, pins p″″, notched segment A″, fan F, discharge-tube F″″, suction-mouth and guard F″ F‴, and bolt ƒ.

2. The post P, cranked at p, in combination with the lever P″, pins p″″, flat foot P′, semicircular pivot p′, quadrantal step, pin p″, semicircular groove p‴, screw Q, miter-gear q q′, handle Q′, and cross bar C.

3. The cranked post P, having flat foot P′, with semicircular pivot p′, in combination with a step in the bed-plate B, having the front half or three-quarters cut away, pin p″, and semicircular groove p‴ concentric with the pivot p′.

4. The cranked post P, in combination with the triangular frame A, wheel-guard F‴, and bolt ƒ.

5. The longitudinally-slotted cross-bar C, in combination with the slide block T, adapted to receive saw-arbor T′, screw Q, miter wheels q q′, and handle Q′.

6. The combination of the driving-shaft D, the rocking shaft R, emery-wheel shaft W, swing-frame Y, and fan F.

7. The combination of the driving-shaft D, cone-pulley D′, rocking shaft R, sleeved loose cone-pulley R′ R″, the hubs of the swing-frame Y, emery-wheel shaft W′, and pulley W″.

8. In combination with an emery-wheel, W, shaft W′, swing-frame Y, and counterbalanced lever L, the fan F, suction-mouth and guard F″ F‴, the suspension-bolt ƒ, the upper journal of post P, and discharge-tube F″″.

Signed at Deseronto, Ontario, this 14th day of October, 1884.

JAMES H. TOTMAN.

In presence of—
  E. W. RATHBUN,
  E. ARTHUR RIXEN.